United States Patent Office 3,440,061
Patented Apr. 22, 1969

3,440,061
BULK HANDLING OF COMESTIBLES
Thomas J. Horan, 3111 Rowena Drive,
Los Alamitos, Calif. 90720
Filed Jan. 26, 1965, Ser. No. 428,116
Int. Cl. A23b 1/06
U.S. Cl. 99—192                1 Claim

ABSTRACT OF THE DISCLOSURE

A method for the long distance delivery of comestibles which comprises introducing a weighed bulk quantity of the comestibles and particulated ice into a bulk shipment container having a capacity of from about 175 to about 350 gallons, covering the container, and shipping the covered container to a distant distribution center while continuously draining fluids from the filled container. At the distribution center, the container is dumped to separate the poultry from the ice whereupon the poultry is repackaged in smaller containers for distribution to the retailers.

This invention relates to a method for the handling and shipment of comestibles, in particular poultry, and to a package comprising such iced comestibles in bulk quantities.

Conventionally, live poultry is transported to the processor where the birds are killed, bled, eviscerated, and plucked on a continuous conveyor. After the poultry has been drawn or eviscerated, it may be frozen quickly or the poultry carcasses can be cooled and packaged as fresh meat. In typical prior art packaging, the poultry carcasses are segregated and packaged as to class, grade, color and weight.

The poultry are conventionally discharged into open bins from where they are removed by personnel on the packing line and placed into the desired shipping container. The container is then weighed, the tare subtracted and the net weight is marked on the container.

Typical containers include wood barrels, wood crates, and wood boxes which are constructed of sawed wood. The most common form of packaging uses wire bound wooden veneer boxes, either with or without an ice packing. However, these wooden boxes are disadvantageous from a sanitation viewpoint since the wood is readily soaked with blood and animal juices, thus providing a breeding place for bacteria, flies, and other pests. The blood-soaked boxes are messy and odorous and disposal of these bulky boxes is difficult and a source of pest attraction while in a trash compound. A further disadvantage in the use of the conventional wood boxes entails the hazard of materials leaching from the wood boxes, when soaked with fluids, and contacting the box contents. These leached substances are particularly deleterious to poultry taste and quality.

From the economic viewpoint, the cost of using wood boxes is very high since the box is not returnable and therefore must be disposed of after use. This means that each load of poultry must have the container cost included in the sales price. Thus, by not being returnable and because of soaking with blood, water, and animal juices, these wooden boxes give fresh poultry a serious economic handicap in competing in the fresh meat market.

The poultry industry has generally failed to adopt bulk handling methods partly because of the inherent weakness of the aforementioned nonreturnable wooden containers which are commonly constructed from inexpensive and thin wood veneer. Accordingly, relatively small containers are employed which must be individually packed, weighed, and shipped to the consumer in a method involving countless repetitions of unit operations that could be easily combined in a few steps by use of bulk handling methods. Additionally, the relatively small shipment containers used heretofore have not been sufficiently strong to permit extensive stacking in the transportation vehicle.

It is an object of this invention to introduce bulk handling methods in the packaging and shipping of comestibles, particularly of poultry.

It is a further object of this invention to provide a bulk shipment container that can be employed for the bulk handling of comestibles, particularly poultry.

It is an additional object of this invention to provide an improved method for the air shipment of comestibles.

It is also an object of this invention to provide a method for the bulk packing of comestibles, and particularly poultry, in a container for shipment over long distribution routes in an iced condition.

Other and related objects will be apparent from the following description of the invention.

I have found that the foregoing objects and their attendant advantages can be particularly realized by use of a shipment container comprising rigid side walls with a foraminous base and formed of a moisture impervious material, these containers normally having a bulk volume from about 175 to about 350 gallons. My improved method for use of the aforementioned bulk shipment container briefly comprises the bulk weighing of the comestibles, the packing of the comestibles and ice in the bulk shipment container, the transportation of the packed container to a distribution center and the repacking of the comestibles into smaller retail containers for shipment to the retail stores.

It is to be understood that although the packing process of my invention and the refrigerated bulk packages resulting therefrom are broadly applicable to the handling of any comestible, they are particularly applicable to the handling of fresh meat. Thus, although the packing method and the resulting refrigerated containers are specifically described in connection with poultry processing, the process and packages can also be used in the handling of any putrefiable foodstuffs such as fresh vegetables, fresh fruits and fresh meats such as the carcasses of rabbits, fish, shrimp, lobster, crab, and the like as well as fresh eviscerated poultry such as chickens, turkeys, ducks, and the like.

The invention will now be described by reference to the figures of which:

Figure 1:
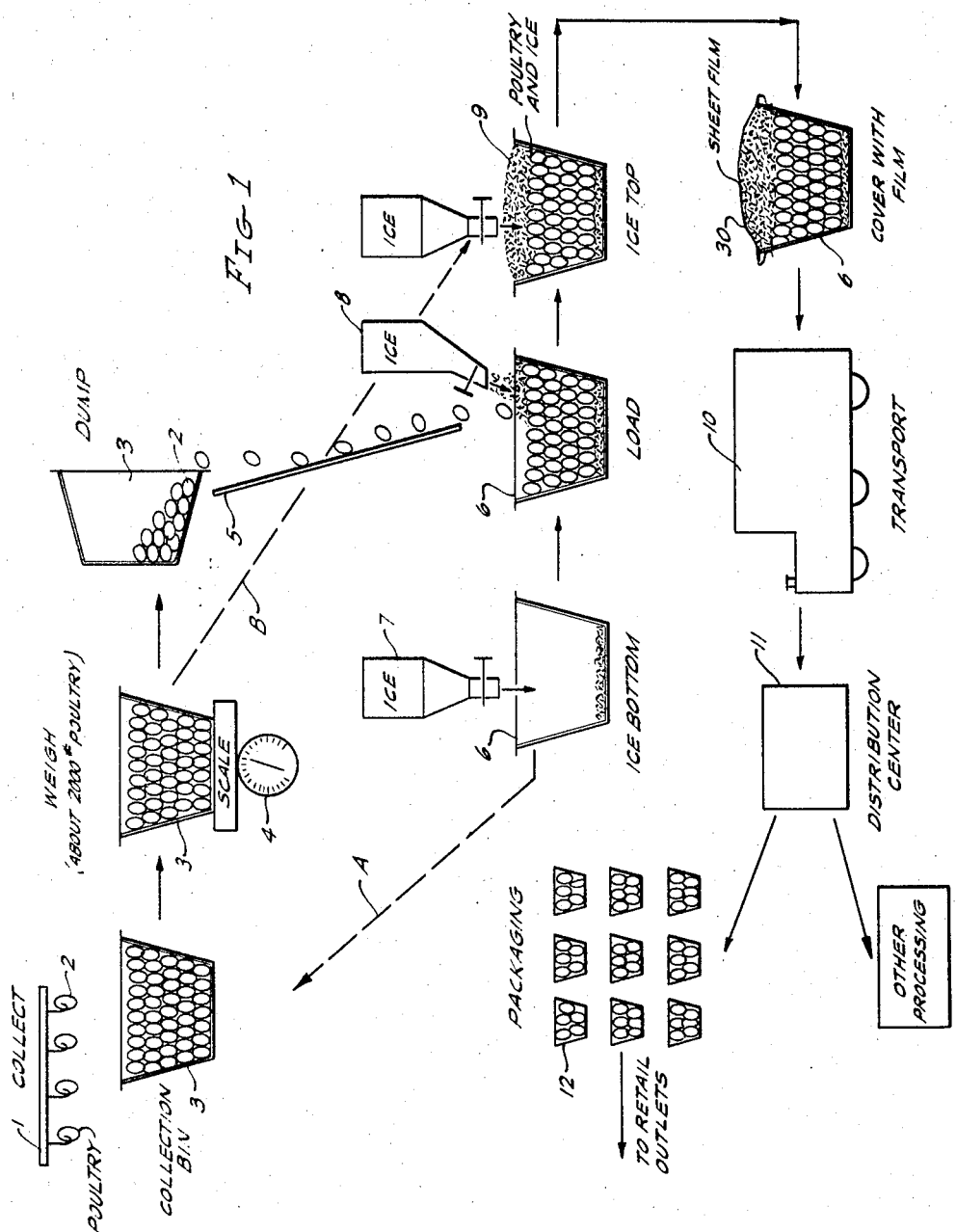
FIGURE 1 illustrates the improved bulk shipment method of my invention.

Referring now to FIGURE 1, the packing method of this invention commences at the last station on the poultry processor's conveyor line 1. The poultry 2 are automatically released from the conveyor according to their unit weight and fall into one of several sanitized bulk collection and weighing bins 3. The poultry can be cooled prior to handling as is customary, where, to prevent rapid deterioration, poultry is usually cooled quickly after eviscerating to a temperature between about 32° and 40° F., and preferably to about 32° F. However, in some processing environments, the poultry is packed while still warm and my process is applicable to carcasses near live poultry temperature as well as to cooled poultry.

The bins 3 are of the same capacity as the bulk shipment containers and usually are from about 175 to about 350 gallons, preferably from about 225 to about 275 gallons in capacity. Preferably, the bins are formed of rigid side walls and have a foraminous bottom to permit drainage of fluids. To impart strength to the container, the side walls and/or the bottom can be ribbed or corrugated. The bins are self-supporting so that they can be handled by conventional fork lifts or other bulk handling equipment.

The tare weight of the collection and weighing bins 3 is predetermined and after bin 3 has been filled it is again weighed on scale 4 and the tare of bin 3 is subtracted to obtain the bulk weight of the poultry. Bin 3 is then dumped to discharge the poultry onto a chute 5 which directs the poultry into sanitized bulk shipment container 6. If desired, a hopper can be used with chute 5 to insure an even flow of poultry into container 6.

Bulk shipment container 6, hereafter described in greater detail, is charged with about 3 to 6 inches of ice from ice hopper 7 and then packed with the poultry from chute 5 and ice from hopper 8, which are placed in intermittent layers until the container is filled. Then, a cover layer of ice is mounded over the poultry to a height of about 4 to 7 inches, generally illustrated at 9. The continuously draining container is then covered with a suitable cover 30 which can be rigid but, preferably, comprises a plastic film or sheet. In general, any moisture resistant material can be used for cover 30 such as rubber, waxed paper, etc. A satisfactory cover 30 comprises a plastic sheet of 2 to 5 mils thickness. Suitable plastics are polyethylene, polypropylene, polyvinylidene chloride, etc. The net weight obtained in the aforementioned weighing step is then marked on the container.

Alternatively, bulk shipment container 6 can be charged with ice on the bottom of container 6 from hopper 7, weighed, then passed to the collection step via dotted line A. The container 6 can then be filled with poultry 2, either solidly or in layers with finely divided, weighed amounts of ice, and then weighed to obtain the poultry weight by difference on scale 4. After weighing, the filled container 6 is passed via dotted line B to the subsequent top icing step. Crushed, shaved or flaked ice is preferably employed for packing, and from about 80 to about 300 pounds of ice are used to pack each 1,000 pounds of poultry. Because large chunk ice causes tissue distortion, the ice preferably is employed in a finely divided or particulated state, from about $1/16$ to about $1/2$ inch mean diameter. The tissue distortion and strippling that occurs with larger chunk of ice can be removed by massaging of the poultry; however, this necessitates an additional handling step.

Filled bulk shipment containers 6 are then loaded into a suitable refrigerated transport shown as 10 and transported to a distant distribution center, e.g., train, truck, plane, boat, etc. Finely divided ice can also be sprayed or otherwise distributed around the containers after they are loaded on the transportation means. In one embodiment of my invention wherein air transport is employed, it is contemplated to control the storage temperature of the poultry during the transport by variation in the altitude of the plane. In this embodiment, the use of ice as a refrigerant can be reduced or eliminated completely. To illustrate, the temperature of the atmosphere varies significantly with altitude, there being approximately 3° to 4° F. temperature decrease for each 1,000 feet increment in distance above sea level. The poultry is packed with only sufficient ice to maintain it in an iced condition until flight time and is loaded in holds in the aircraft that are subject to the environmental temperature. After take-off, the pilot selects the flight altitude having approximately a temperature from about −10° to about 35° F., preferably about 0° to about 20° F. to insure refrigeration of the poultry.

Upon arrival at distribution center 11, transport 10 is unloaded, the bulk shipment containers are uncovered, and the contents are dumped into a separator that separates the poultry from the remaining ice. Containers 6 are usually cleaned and sanitized at this point for return to the originating packing plant. Any suitable means can be used to effect this separation such as a grate that is shaken. In one embodiment, the poultry is discharged into bins for packing into a plurality of small delivery cartons 12 which are employed to deliver the poultry to the retail outlets. These delivery cartons preferably are the type described and claimed in my copending United States patent application, Ser. No. 116,332, now Patent No. 3,172,769. Briefly, such cartons 12 comprise a foraminous metal or plastic basket that is lined with a folded sheet material, e.g., cardboard, which is also provided with a bottom drain to discharge melted ice and fluids. These cartons 12 are substantially smaller than the bulk shipment containers to facilitate their handling during delivery of the poultry to the retail center. Cartons 12 having capacities from about 15 to about 40 gallons, preferably about 25 gallons, are used for the delivery service.

The poultry is loaded into cartons 12 above a layer of ice approximately 2 to 6 inches in depth which has been previously placed in the carton. Ice in a finely divided state such as previously described, is introduced with the poultry to fill carton 12. Carton 12 is then heaped with ice to compensate for compacting. Carton 12 is then placed under a hydraulic packer having a platen which forces the heaped ice down into the carton 12 to form a compact integral mass which is no longer flowable. The lid is then folded over the compacted ice and chicken mass in carton 12 to protect the contents.

The poultry must, of course, be weighed and the net weight indicated on carton 12 or the bill of lading. Preferably, the poultry charged to each delivery carton 12 is weighed prior to the aforementioned packing. If desired, however, the ice packed into carton 12 can be weighed and its weight added to the tare weight of carton 12 to be subtracted from the gross weight of the packed carton 12 in determining the net poultry weight. In this manner, packed carton 12 is weighed to determine poultry weight.

The aforementioned methods lend themselves with particular advantage when poultry are transported into jurisdictions which require the weighing of all imported poultry and meats. There is a greatly reduced tare weight using my method and apparatus, thus giving an advantage of greatly increased payload. In the conventional shipment of poultry into these jurisdictions, each of the many individual small shipment containers must be emptied, the poultry separated from the ice and then reweighed and repacked, often into fresh containers, since the initial shipment containers have been contaminated with juices and weakened by moisture absorption. Consequently, all the separate weighing and packing steps previously performed at the processor's plant must again be repeated. In contrast, according to my invention, the poultry are handled only in bulk quantities at the processor's plant and therefore, the redistribution of the poultry into the delivery cartons combines the functions of retail packing and of compliance with the local laws of the importing jurisdiction. In this manner, the needless repetition of the prior handling techniques is avoided. Further, the weighing of large containers is easier and better than the weighing of many small containers.

The bulk shipment containers are returned to the processor's plant for reuse. Prior to reuse, the containers are washed and sterilized. Any conventional washing can be used for this step and steam or chemical disinfectants can be used to sterilize or render the containers sanitary for reuse.

Figure 2:
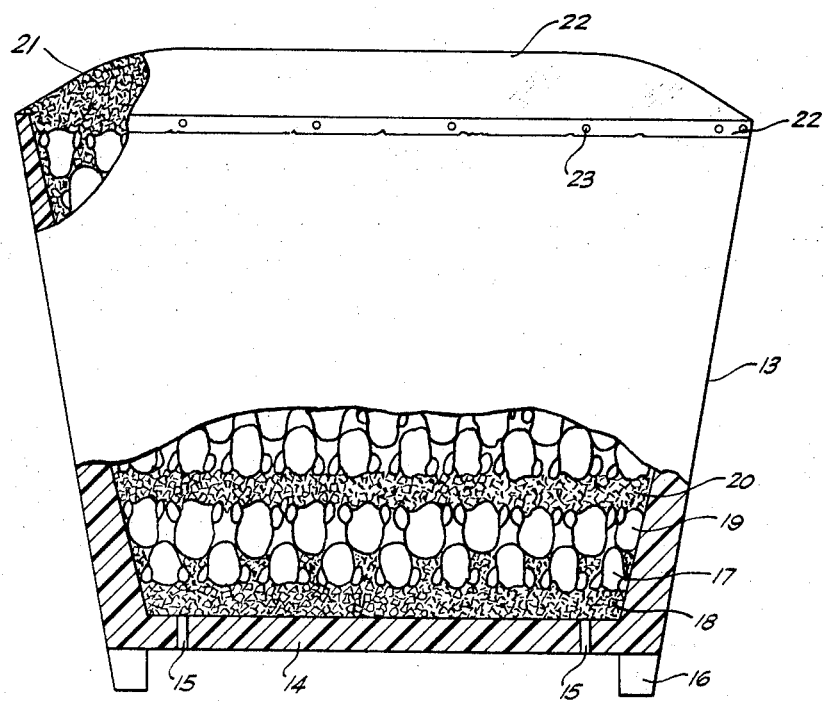
FIGURE 2 illustrates the improved bulk packing of poultry in the bulk shipment container of my invention.

Referring now to FIGURE 2, there is illustrated a bulk shipment container 6 according to my invention. As illustrated, this container takes the shape of upright walls 13 which are preferably of a moisture impervious material such as reinforced plastic. Suitable plastics include polyethylene, polypropylene, polystyrene, etc. Preferably, reinforced fiberglass is used. Other suitable materials include stainless steel, aluminum, or resin-coated wood. The sidewalls are attached to a base or bottom 14 which is preferably of the same material. When fiberglass or plastic materials are used for the container walls, the bottom and side walls can be cast as an integral unit. Often, ribbing is formed on the exterior for added strength. The bottom is foraminous, having drain holes such as 15 for the continuous draining of water from ice as it melts and of the body fluids from the poultry 19. Legs 16 can be provided on the bottom of container 6 to elevate it above the floor and thereby readily permit the use of fork lifts or other bulk handling equipment in the moving of bulk shipment containers 6. A particularly preferred feature in container 6 is the ability to nest with a like container, thus occupying a greatly reduced space when being returned empty.

FIGURE 2 also illustrates the preferred packing method of my invention. As illustrated, the bottom of container 6 is covered with a layer 18 of approximately 2 to 6 inches of crushed ice. The first layer 17 of poultry is then placed with the backs down on the ice layer 18. A second layer 19 of poultry is placed on the first layer 17, with breasts down which are nested between the upright breasts of the first layer 17. A layer of ice 20 is next placed on the second layer of the poultry and the stacking is repeated until the container is filled. In this manner, the poultry are securely packed in the container with an even distribution of forces so that crushing of the poultry in the lowermost layers is minimized. As previously mentioned, bulk shipment container 6 is heaped with a cover layer of ice 21 to a depth of about four to seven inches and then covered with a suitable sheet 22 of plastic or other protective material. Snap fasteners 23 or other well known means for securing a cover can be used to retain cover sheet 22 in place during transport of container 6. A satisfactory package can also be made by omitting the layering of ice and meat and in lieu thereof pack ice on the bottom of container 6, substantially fill with poultry or other meat, and pack with ice on top as set forth above.

The preceding disclosure of the invention is not intended to be unduly limited to the specific and illustrated method steps and apparatus elements, but rather is intended to broadly encompass modifications and obvious changes apparent to those skilled in the art. It is intended that the invention therefore be defined by the following claim which includes the method steps and elements and their obvious equivalents.

I claim:

1. The method for the long distance delivery of comestibles from an originating processing plant to a consumer that comprises:
   (a) introducing a weighed bulk quantity of said comestibles and particulated ice into a bulk shipment container to fill said container substantially completely with said comestibles and said ice, said bulk shipment container having a capacity of from about 175 gallons to about 350 gallons;
   (b) applying a final top layer of particulated ice to the contents of said filled container;
   (c) covering said container with a moisture resistant material and fastening said material around the top of the container, whereby the covered container may be shipped to a distant distribution center while continuously draining fluids therefrom and the comestibles dumped and separated from the ice at said distribution center.

References Cited

UNITED STATES PATENTS

| | | | |
|---|---|---|---|
| 2,501,898 | 3/1950 | Haggerty | 99—192 X |
| 2,521,814 | 9/1950 | Waters | 99—192 |
| 2,871,131 | 1/1959 | Martens | 99—194 |
| 3,196,021 | 7/1965 | Oas et al. | 99—194 X |

HYMAN LORD, *Primary Examiner.*

U.S. Cl. X.R.

99—193, 194, 195